(12) United States Patent
Fillbrandt et al.

(10) Patent No.: US 11,595,638 B2
(45) Date of Patent: Feb. 28, 2023

(54) CALIBRATION UNIT FOR A MONITORING DEVICE, MONITORING DEVICE FOR MAN-OVERBOARD MONITORING, AND METHOD FOR CALIBRATION

(71) Applicant: Robert Bosch GmbH, Stuttgart (DE)

(72) Inventors: Holger Fillbrandt, Bad Salzdetfurth (DE); Claudio Scaravati, Milan (IT); Gabriele Mangiafico, Milan (IT); Hans-Dieter Bothe, Seelze (DE); Paolo Mario France Terzon, Macherio (IT); Sarah Schuette, Hannover (DE); Stefano Riboli, Lacchiarella (IT)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/428,915

(22) PCT Filed: Jan. 13, 2020

(86) PCT No.: PCT/EP2020/050667
§ 371 (c)(1),
(2) Date: Aug. 5, 2021

(87) PCT Pub. No.: WO2020/160874
PCT Pub. Date: Aug. 13, 2020

(65) Prior Publication Data
US 2022/0191467 A1    Jun. 16, 2022

(30) Foreign Application Priority Data
Feb. 6, 2019    (DE) ..................... 10 2019 201 490.9

(51) Int. Cl.
*G06T 7/80* (2017.01)
*G06V 20/58* (2022.01)
(Continued)

(52) U.S. Cl.
CPC ............. *H04N 17/002* (2013.01); *G06T 7/80* (2017.01); *H04N 7/18* (2013.01)

(58) Field of Classification Search
CPC ...... B63C 9/0005; G06V 20/58; G08B 21/08; G06T 7/80
See application file for complete search history.

(56) References Cited

U.S. PATENT DOCUMENTS 5,699,444 A    12/1997  Palm
7,574,315 B2 *  8/2009  Bothe ....................... G06T 7/80
                                                             702/85
(Continued)

FOREIGN PATENT DOCUMENTS

EP    2779102 A1    9/2014
WO    2017187407 A1  11/2017

OTHER PUBLICATIONS

Translation of International Search Report for Application No. PCT/EP2020/050667 dated Mar. 30, 2020 (3 pages).

*Primary Examiner* — Brian P Yenke
(74) *Attorney, Agent, or Firm* — Michael Best & Friedrich LLP (57) ABSTRACT

The invention relates to a calibration unit (2) for a monitoring device (1), wherein the monitoring device (1) is designed as man-overboard monitoring of a ship section (4), wherein the monitoring device has at least one camera (5a, 5b) for video-monitoring the ship section (4) and for providing video data, wherein the camera (5a, 5b) has at least one intrinsic calibration parameter (11) and at least one extrinsic calibration parameter (12), wherein the video data is provided to the calibration unit (2), comprising an input module (9) for a user to input one or more calibration elements (10) and comprising an evaluation module (8), wherein the evaluation module (8) is designed to determine (Continued)

the unknown calibration parameters (11, 12) based on the calibration elements (10), in particular their orientation and/or extension.

14 Claims, 3 Drawing Sheets

(51) Int. Cl.
*G08B 21/08* (2006.01)
*B63C 9/00* (2006.01)
*H04N 17/00* (2006.01)
*H04N 7/18* (2006.01)

(56) References Cited

U.S. PATENT DOCUMENTS

| | | | | |
|---|---|---|---|---|
| 8,059,154 B1* | 11/2011 | Kiro | ................. | G06T 7/80 |
| | | | | 348/184 |
| 9,569,671 B1* | 2/2017 | Maali | ................. | G06T 7/292 |
| 9,896,170 B1* | 2/2018 | Assal | ................. | H04N 5/332 |
| 9,965,870 B2* | 5/2018 | Claveau | ................. | G06T 7/80 |
| 10,635,844 B1* | 4/2020 | Roose | ................. | G06F 30/20 |
| 10,839,557 B1* | 11/2020 | Arora | ................. | G06T 19/006 |
| 11,010,602 B2* | 5/2021 | Baldacci | ................. | G06V 10/758 |
| 11,270,467 B2* | 3/2022 | Devitt | ................. | G06T 3/0068 |
| 11,288,517 B2* | 3/2022 | Buchika | ................. | H04N 5/33 |
| 2007/0070190 A1* | 3/2007 | Yin | ................. | G08B 13/19626 |
| | | | | 348/36 |
| 2008/0240616 A1* | 10/2008 | Haering | ................. | G06V 10/147 |
| | | | | 382/294 |
| 2009/0085910 A1 | 4/2009 | Elsberg et al. | | |
| 2012/0154604 A1 | 6/2012 | Chen et al. | | |
| 2012/0229282 A1* | 9/2012 | Zagami | ................. | G01S 17/86 |
| | | | | 348/148 |
| 2013/0010111 A1* | 1/2013 | Laforte | ................. | H04N 5/23216 |
| | | | | 348/143 |
| 2013/0169809 A1* | 7/2013 | Grignan | ................. | B63C 9/0005 |
| | | | | 348/148 |
| 2013/0214942 A1* | 8/2013 | Joss | ................. | B63C 9/0005 |
| | | | | 340/984 |
| 2016/0266246 A1* | 9/2016 | Hjelmstad | ................. | G01S 15/86 |
| 2016/0350921 A1* | 12/2016 | Bataller | ................. | G06F 16/51 |
| 2017/0154223 A1* | 6/2017 | Maali | ................. | H04N 5/77 |
| 2018/0043977 A1* | 2/2018 | Assal | ................. | B63C 9/0005 |
| 2018/0075593 A1* | 3/2018 | Wang | ................. | G06T 7/85 |
| 2019/0137620 A1* | 5/2019 | Cappelletti | ................. | G01S 13/886 |
| 2019/0347783 A1* | 11/2019 | Salgian | ................. | G06T 7/0004 |
| 2020/0027242 A1* | 1/2020 | Koyama | ................. | B64C 39/024 |
| 2021/0042962 A1* | 2/2021 | Zhang | ................. | G06T 7/80 |
| 2021/0312190 A1* | 10/2021 | Fillbrandt | ................. | G06V 20/52 |
| 2022/0101713 A1* | 3/2022 | Fillbrandt | ................. | G06V 10/147 |
| 2022/0148226 A1* | 5/2022 | Devitt | ................. | G06T 7/593 |
| 2022/0301302 A1* | 9/2022 | Murphy | ................. | G06V 10/25 |

\* cited by examiner

CALIBRATION UNIT FOR A MONITORING DEVICE, MONITORING DEVICE FOR MAN-OVERBOARD MONITORING, AND METHOD FOR CALIBRATION

BACKGROUND OF THE INVENTION

A calibration unit for a monitoring device is proposed. The monitoring device is designed as a man-overboard monitor of a ship section. The monitoring device has at least one camera for video monitoring of the ship section, wherein the video monitoring is provided as video data. The camera has intrinsic calibration parameters and extrinsic calibration parameters. The video data are provided to the calibration unit.

On ships and in particular on passenger ships it is a known problem that passengers can fall overboard unnoticed during the journey. Such events are referred to as man-overboard events. The chances of survival during such an event sink increasingly with the time which passes until the event has been discovered. Shipping companies have an interest in being able to notice such events as quickly as possible. In particular, government regulations and/or requirements of insurance companies exist which require increased monitoring and improved detection of such events. On cargo ships, such monitoring is implemented by means of armbands or transponders.

In video monitoring and also in other contactless monitoring devices, it is a conceivable problem that moving objects, for example spray, birds, or things thrown overboard could be incorrectly detected as a man-overboard event. A monitoring device has to reduce such incorrect detections under a specific value to be practical. For example, the ISO norm ISO/PAS21195 "Ships and marine technology" requires that monitoring systems for man-overboard monitoring have a "true positive" detection rate of greater than 95% and on average have a false alarm rate ("false positive rate") of less than one single false alarm per day per ship.

SUMMARY OF THE INVENTION

A calibration unit for a monitoring device is proposed. Furthermore, a monitoring device having the calibration unit is proposed, as well as a method for calibration.

A calibration unit for a monitoring device is proposed. The calibration unit in particular forms a human-machine interface for the monitoring device. The monitoring device can be calibrated, in particular can be initially calibrated or recalibrated, by means of the calibration unit. The calibration unit is designed, for example, as a graphic user interface for initialization, setup, and/or adjustment of the monitoring device.

The monitoring device is designed for man-overboard monitoring of a ship section. The monitoring device is part of and/or integrable in a ship, in particular a passenger ship. The man-overboard monitoring by means of the monitoring device provides, for example, differentiating whether a human and/or a dummy simulating the human has gone overboard or another type of object. The ship section is, for example, part of a common area of the ship, preferably a section on which a person can go overboard, and especially a region having railings or windows, but also mechanically unsecured regions, for example, locations at which service work is carried out or at which lifeboats are located. Furthermore, it is preferably provided that the ship section forms a monitoring section. The ship section is furthermore ideally to include a part of the water surface; however, this is not absolutely required. The monitoring device can furthermore monitor multiple ship sections and multiple monitoring devices especially can monitor a circumferential region around the ship. For example, the monitoring device is designed to output an alarm upon establishing a man-overboard event.

The monitoring device has at least one camera. The camera is preferably a color camera. Especially, it can be provided that the camera or at least one camera is designed as an infrared camera. It is particularly preferred that a camera comprises two camera units, wherein one camera unit represents a normal video camera in the visual wavelength range (color or black-and-white camera) and the other camera unit represents an infrared camera, preferably a thermal camera (far infrared camera); such cameras depict the thermal radiation of objects in images (thermography). It is thus possible to ensure the monitoring of the ship section 24 hours a day, that is to say both in darkness via thermal imaging data and also in daylight via color or black-and-white image data, wherein each camera is also suitable as such for all-day operation in the event of sufficient sensitivity. The monitoring device especially has a plurality of cameras, wherein the cameras can monitor multiple ship sections, the ship sections can be arranged overlapping or nonoverlapping. It is particularly preferred that the camera is installed laterally, for example on a ship side. The camera monitors the ship section in videos and/or images. In this case, for example, a region of the ship and also an exterior region of the ship facing toward the ocean and/or the ocean surface is monitored by videos. The video monitoring is provided by the camera and/or cameras as video data. The monitoring can also be provided by the camera as metadata (man-overboard event: when, at which ship position, falling trajectory in the image and in 3D, object size, etc.).

The camera has at least one intrinsic calibration parameter and at least one extrinsic calibration parameter. Especially, each camera has a plurality of intrinsic calibration parameters and a plurality of extrinsic calibration parameters. The intrinsic calibration parameters are in particular calibration parameters which are specified by the camera itself, in particular because of production, this means in particular that they are parameters which are not dependent on the attachment location and the alignment of the camera. Intrinsic calibration parameters are, for example, imaging parameters of the camera, for example the focal length of a camera. The intrinsic calibration parameters are especially fixed parameters, that is to say parameters which ideally do not change at all or in reality only change slightly over the lifetime and/or functional time of the camera and/or the monitoring device. For example, the intrinsic calibration parameters can be previously known and/or can be initially determined during or before the installation of the monitoring device and/or calibration unit and/or camera.

In particular camera parameters which are dependent on an arrangement, orientation, and/or installation of the camera are understood as extrinsic calibration parameters. For example, extrinsic calibration parameters describe the alignment of the optical axis of a camera with respect to a horizontal plane, for example the ocean surface, or a vertical plane, for example the ship plane defined by a ship side. The orientation can comprise, for example, an inclination angle or the distance of the camera to a reference surface. Furthermore, extrinsic calibration parameters can describe, for example, the distance of a camera to a reference point and/or a reference plane. The extrinsic calibration parameters are installation-dependent parameters. The extrinsic calibration parameters are therefore preferably defined by the installation and/or arrangement of the camera and/or can be changed by a displacement, change of the alignment, and/or removal of the camera. In particular, it is possible, based on the knowledge of the intrinsic and the extrinsic calibration parameters, to determine distances, extensions, velocities, accelerations, orientations, and/or positions in the ship section and/or on the water surface for objects or other structures in the image from the video data, in particular in 3D position dimensions.

The calibration unit has a data connection to the cameras. The video data are provided to the calibration unit. In particular, the intrinsic calibration parameters can be provided to the calibration unit. The calibration unit can preferably form a decentralized module. For example, the calibration unit forms a computer unit or a software module.

The calibration unit has an input module. The input module is designed in particular for graphic input by a user. Graphic regions can be indicated, drawn, and/or selected by means of the input module. In particular, a numeric or alphanumeric input can preferably be carried out by means of the input module. For example, the input module is designed as a touch screen.

By means of the input module, a user can input, select, define, and/or draw a calibration element, wherein the calibration element preferably has an orientation and/or an extension. In particular, a plurality of calibration elements can be input by the user. A calibration element is understood, for example, as an item of information and/or a structure in the image and/or the ship section. In particular, it is provided that the user and/or the calibration unit possesses and/or has additional items of information on the calibration element. In particular inferences about calibration parameters are to be enabled by means of the calibration element. Calibration elements are, for example, lines, areas, regions in section, two-dimensional objects, or three-dimensional objects. A calibration element in particular has an orientation and/or an extension and/or a distance from the camera. The extension is, for example, the distance in 3D between two points and/or a length, a width, or a depth. The orientation of the calibration element is, for example, a direction in a world coordinate system and/or another reference coordinate system. An orientation can in particular also comprise and/or describe angles and/or orientations of calibration elements in relation to one another. For example, a calibration element can be a perpendicular on a water surface, a ship plane, or the horizon. Calibration elements can also be angular positions of the hull, for example of the railing relative to the ship surface and/or the ship floor. The calibration element can be defined and/or input manually in the form of lines, points, and/or polygons, for example. In particular, the orientation and/or the extension can be input in the form of items of numeric information by the user by means of the input module. For example, the user assigns lengths, angles, and/or orientation numerically or alphanumerically to the calibration element.

The calibration unit has an evaluation module. The evaluation module forms, for example, a software module or a computer module. For example, the evaluation module can be executed on the input module and/or can form a joint module with it. The calibration elements and/or the video data and/or a scene model are provided as data to the evaluation module. Furthermore, all items of information of the calibration elements are provided to the evaluation module. In particular, the already previously known intrinsic and extrinsic calibration parameters are also known and/or provided to the evaluation module. The evaluation module is designed, based on the calibration elements, in particular including all associated items of information and/or the previously known calibration parameters, and/or the scene model, to determine the still unknown calibration parameters. For example, the determination of the unknown calibration parameters is performed once upon startup of the monitoring device or regularly, for example at inspection times. The evaluation module is especially designed, based on the intrinsic calibration parameters, for example focal length and lens distortion, as well as the provided calibration elements, the orientation, viewing direction, and/or installation arrangement, for example the distances from reference surfaces, especially the water surface or the ship plane, to determine the camera. Calibration elements correspond in particular to elements, structures, and/or real objects in the ship section which is monitored by the camera as video data. For example, a calibration element is a visible line in the real ship section which has a known length and/or orientation. This line is depicted by the camera, so that the evaluation module, based on the depiction of the line and the known length and/or orientation, can determine the unknown intrinsic and/or extrinsic calibration parameters. The determination of the unknown calibration parameters by the known calibration parameters, the known calibration elements, and/or the scene model is preferably based on the lens equation and/or imaging equation of the camera.

The invention is based on the consideration that in the monitoring of a ship section using cameras for man-overboard monitoring, the cameras have to be calibrated sufficiently precisely to enable good and reliable monitoring with few false alarms. By means of the calibration unit, calibration elements which are located in the ship section can be optically and/or numerically defined by a user, wherein an evaluation module determines the required unknown calibration parameters based on this selection. A calibration unit which is particularly easy to operate is thus provided, which enables reliable and accurate calibration of the monitoring device. In particular, a plurality of cameras of a monitoring system may be calibrated rapidly and thus cost-effectively by means of the calibration unit.

It is optionally provided that the extrinsic calibration parameters describe an alignment of the camera in a three-dimensional world coordinate system. The three-dimensional world coordinate system is preferably a Cartesian coordinate system. The world coordinate system is, for example, the coordinate system of the ship, the ship section, and/or spanned by the ocean surface and a perpendicular, for example the "ship plane" thereto. The extrinsic calibration parameters can furthermore comprise an inclination angle and a distance, in particular in the three-dimensional coordinate system and/or to the water surface. Furthermore, extrinsic calibration parameters can comprise, for example, a distance and an orientation to a vertical ship plane, for example to the center of the ship, and/or to a lateral ship side.

It is particularly preferred that the intrinsic calibration parameters comprise lens parameters, imaging parameters, a focal length, or a lens distortion of the camera. For example, the intrinsic calibration parameters are stored and/or implemented by the producer as data in the camera, wherein the camera relays and/or provides the intrinsic calibration parameters upon connection to the monitoring device and/or to the calibration unit. The intrinsic calibration parameters are the parameters which are necessary and/or required for describing the optical imaging by the camera.

One embodiment of the invention provides that the input module is designed so that the user can input, define, and/or select the intrinsic calibration parameters. For example, the user and/or an installer of the monitoring device and/or the camera can input the intrinsic calibration parameters by means of the input module. For example, the input module has for this purpose an input mask into which the user can input the required parameters, values, and/or characteristic variables. Furthermore, it can be provided that a type designation or model designation of the camera is selectable by means of the input module, wherein a data set having the intrinsic calibration parameters is stored and/or retrievable in the case of the type designation and/or model designation in the input module or evaluation module.

It is particularly preferred that a calibration element is formed by at least two alignment lines. An alignment line is formed, for example, by a horizontal line on the outer ship side of the ship, for example by a section of the railing or a ship deck. Alternatively and/or additionally, an alignment line can be formed by a horizontal line on another structure, for example a wall of cabins, in the ship section in general. Furthermore, it is possible that a calibration element is formed by a horizon line, for example the water level at a great distance, or the alignment point formed from ship plane at a great distance and the horizon line, or straight lines on the ship, the length and alignment of which are known, or other suitably aligned structures.

One embodiment of the invention provides that the calibration unit comprises a model module, which can also model the view of the ship section more complexly than by a single plane. In particular, the model module can be provided by the technician via the input module, in that the technician marks and/or spatially delimits structures on the ship in the displayed video image, for example using a polygon, and assigns them an alignment and position in 3D. These items of information can, for example, be or become taken manually or automatically from a CAD plan of the ship. In particular, the model module can be part of the evaluation module. The model module comprises a 3D model of the ship and/or a ship section. In particular, the 3D model is a model of the video-monitored ship section. The 3D model can form a CAD model. In particular, the 3D model comprises dimensions, angles, orientations, and/or lengths of the ship section. The evaluation module is designed to determine the unknown intrinsic and/or extrinsic calibration parameters based on the 3D model. For example, the evaluation module can extract orientations of lines and/or surfaces in relation to one another from the 3D model and determine the unknown calibration parameters by the depiction thereof in the video data. For example, the evaluation module can observe the video data as a depiction of the 3D model having the intrinsic calibration parameters, and can determine the unknown calibration parameters based thereon. In particular, it can be provided that the user selects, dimensions, and/or adjusts a calibration element in the 3D model. This embodiment is based on the consideration of providing a calibration unit which enables a calibration of the camera and/or the monitoring device intuitively and easily.

It is optionally provided that the calibration unit comprises a calibration control module. Furthermore, the calibration unit comprises a display module for displaying the video data. In particular, calibration control module and display module can form a joint module. The calibration module is designed to make one or more model calibration elements definable, selectable, and/or adjustable. A model calibration element is, for example, a calibration element. It has a spatial reference to the 3D model, for example the base point of a vertically aligned linear calibration element is located on a visible surface of the 3D model. Furthermore, the model calibration element in particular also has a base point. For example, the model calibration element can be selectable, drawable, and/or adjustable in the 3D model.

The calibration control module is designed to determine a model calibration element based on its specified reference point in the image, for example the base point, and the known calibration to be checked as a depiction and/or to record it in the video data on the display module and/or to draw it therein ("overlaid" representation). The user can thus assess via a comparison of the displayed and/or drawn model calibration element in the video data on the display module whether the calibration parameters to be checked, for example the initially determined calibration parameters, are determined accurately enough ("error-free"). For example, the user can establish this in that the drawn model calibration element deviates only insignificantly or not at all from the corresponding structure in the video data. For example, the user determines a line in the model or in particular a door or surface, wherein this element defined in the model is converted and visually displayed in the video data. If the calibration parameters to be checked describe the image in an error-free manner, the selected element is thus displayed in the correct location in the video data, in contrast, if an incorrect or inaccurate determination of the calibration parameters or/and a decalibration occurs, the elements are not displayed in the correct location in the video data. An easily and intuitively operable calibration unit is thus provided, which in particular enables the correctness of calibration parameters or/and a decalibration to be established quickly and easily. If inaccurate or incorrect calibration parameters are established, a renewed determination of the calibration parameters is to take place.

It is particularly preferred that the calibration unit has a change determination module. The change determination module is designed to establish a change of the calibration parameters or the 3D structures in the scene, for example due to modifications, as a decalibration. The establishment of the decalibration is carried out in particular on a chronological evaluation of the video data, in particular as to whether a chronological, long-term, and lasting variation of the environment, the ship section, or other parts takes place. For example, the camera attachment can have loosened and/or a modification can have taken place in the ship section, so that the extrinsic calibration parameters have changed or the 3D ship model no longer accurately reflects the 3D structure of the scene. Such a change can be established by an automatic image evaluation of the video data over time or/and via a manual comparison to an image recorded at the time of the calibration parameter determination, for example by superimposed display ("overlaid") of old and current image, for example of an edge image. In particular, the automatically operating change determination module can be designed to report the decalibration to a user so that the user performs a new calibration.

One embodiment of the invention provides that the input module is a module for graphic input, definition, and/or selection of the calibration element and/or the model calibration element. For example, the input module is provided with a touch screen or a computer mouse, with the aid of which the user can draw the calibration element or the model calibration element or can define it by points or a polygon. This embodiment is based on the consideration of providing an easily operable calibration unit which does not require complex programming languages or numeric inputs.

It is particularly preferred that the input module is designed to enable a dimensioning of calibration elements by the user. The dimensioning can take place numerically or alphanumerically. In particular, it can also be provided that known calibration elements are already stored and/or selectable as a data set with dimensioning and/or additional items of information.

A monitoring device for the man-overboard monitoring of a ship section forms a further subject matter of the invention. The monitoring device has at least one camera, wherein the camera is designed to video monitor a ship section. The camera is especially part of the monitoring device. The monitoring device has the calibration unit as described above. The calibration unit has a data connection to the camera, wherein the video data are provided to the calibration unit. Furthermore, the monitoring device has an evaluation unit. The evaluation unit is designed, for example, as a computer unit. The evaluation unit is designed to determine a kinematic variable of an object moving in the monitoring region based on the video data. For example, the evaluation unit determines and/or the evaluation unit recognizes a moving object and determines the kinematic variable for the moving object. The kinematic variable can be, for example, a velocity or an acceleration. Based on the kinematic variable, the evaluation unit is designed to conclude a presence of a man-overboard event. For example, the evaluation unit is designed to determine the path and/or velocity curve or acceleration curve of the moving object and to conclude the presence of a man-overboard event by way of known falling hypotheses such as a falling parabola. Furthermore, the evaluation unit can preferably be designed to conclude a size of the moving object based on the kinematic variable, wherein the size is, for example, the extension and/or the length or the diameter of the object. For example, it is known that falling objects are accelerated at approximately 9.81 m/s$^2$ toward the center of the earth, wherein a size ratio can be concluded by determining the velocity of the moving object in pixels per second. Only objects which have a sufficient size are determined, for example, as man-overboard events, so that false alarms such as those caused by cleaning water, spray, or cigarettes, can be excluded.

It is particularly preferred that the evaluation unit is designed to determine a starting position of the moving object based on the intrinsic calibration parameters and/or the extrinsic calibration parameters and/or the kinematic variable. After the extrinsic calibration parameters define, for example, the alignment and position of the camera and the intrinsic calibration parameters define the imaging equation, a starting position can be determined in three dimensions by the kinematic variable, for example by comparison to the acceleration. An existence of a man-overboard event can be concluded based on the starting position.

For example, the monitoring device provides that a hazardous region is definable by means of the input module. The hazardous region is, for example, a part of the ship and/or the ship section. The hazardous region is distinguished in particular in that these are regions of the ship from which a person can go overboard. Ship sections in the outer region and/or on the ship side are included in the hazardous region, for example. The evaluation unit can be designed, for example, to assess man-overboard events as such when they have a starting position in the hazardous region. Starting positions outside the hazardous region can be discarded by the evaluation unit, for example, and not assessed as man-overboard events.

It is particularly preferred that the evaluation unit is designed to determine a starting position of the fall of a person from onboard in a higher-order ship coordinate system, in particular a number of the deck, a ship side, a longitudinal and lateral coordinate. In particular, the monitoring device is designed to output the starting position in the ship coordinate system on an output unit, in particular a central output unit. This embodiment is based on the consideration that the 3D starting position relative to the camera position and the installation location of the camera are known in the higher-order ship coordinate system and the starting position in the higher-order ship coordinate system is determinable based thereon.

A method for calibrating a camera of a monitoring device for man-overboard monitoring or a monitoring device for man-overboard monitoring having the camera forms a further subject matter of the invention. For the method, calibration elements can be input by a user or technician. A calibration element is an element which has, for example, a position, an orientation, and an extension. In particular, the calibration element is an element or a structure which is located and/or definable in the ship section. The camera has intrinsic and extrinsic calibration parameters. In the method, the unknown calibration parameters are determined based on the calibration elements and preferably on the previously known calibration parameters and/or the scene model. For this purpose, it is calculated with which values for the calibration parameter a correct depiction of a calibration element from the 3D world can be achieved in the 2D video data. For example, it is determined how the calibration element depicts the reality (3D world) by means of the calibration parameters on the calibration element depicted in video. The unknown calibration parameters are determinable by this comparison.

BRIEF DESCRIPTION OF THE DRAWINGS

Further advantages, effects, and embodiments result from the appended figures and the description thereof. In the figures.

DETAILED DESCRIPTION

Figure 1A:
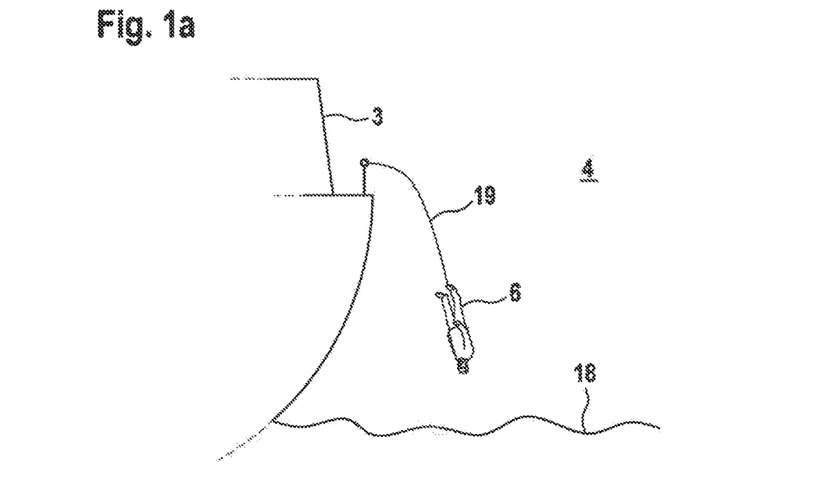
FIG. 1a shows a section monitored using a monitoring device.
Figure 1B:
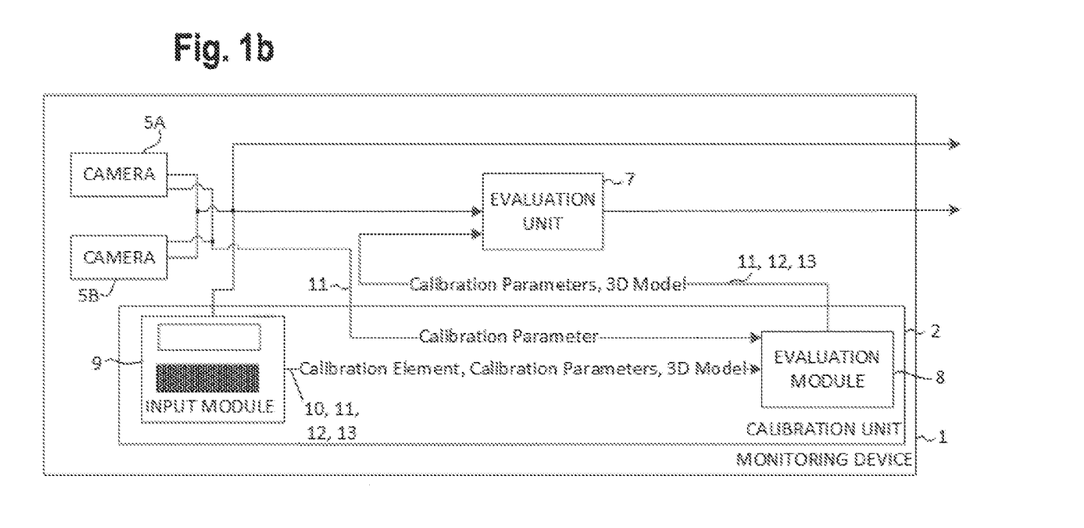
FIG. 1b schematically shows a monitoring device having a calibration unit.

FIGS. 1a and 1b show the monitoring of a ship section 4 using a monitoring device 1 having a calibration unit 2. The monitoring device 1 is designed for monitoring a ship 3. A ship section 4 of the ship 3 is video monitored by means of the monitoring device 1. The monitoring device 1 has two cameras 5a and 5b. The camera 5a is designed as a camera for recording images in the visual range, wherein the camera 5b is designed as an infrared camera and can record and/or produce recordings even in complete darkness. The monitoring device can also consist of only one of the two cameras. The cameras 5a and 5b are oriented on the ship section 4 and depict them in videos and/or images. The recordings are provided as video data to the calibration unit 2. Man-overboard monitoring in the ship section 4 is carried out by means of the monitoring device 1. It is thus monitored whether a person 6 goes overboard and is in danger. The monitoring device 1 determines for this purpose a moving object in the ship section 4. The moving object can be a person 6, for example. By means of the monitoring device 1, a differentiation is carried out as to whether the moving object is a person 6 or another type of object, for example garbage or water. An alarm output only takes place if the moving object was characterized as a falling person 6. Other falling or flying objects such as cigarettes, birds, or the like are not assessed as a man-overboard event, so that no alarm takes place.

A person 6 who falls overboard describes a parabolic trajectory 19. The trajectory ends at the water surface 18 of the ocean. The person 6 and also objects are accelerated by the gravitational acceleration to the ocean. Possible horizontal velocity components of a falling person 6 and also falling objects are in particular not or are nearly not accelerated. The trajectory can be described by the horizontal and vertical object positions or velocity ($v_x$, $v_y$) over time. The velocity $v_y$ represents the accelerated movement perpendicular to the ocean surface, wherein the velocity $v_x$ is a constant or nearly constant velocity parallel to the water surface. The person 6 and/or the falling object has a length which is understood as a diameter, for example. For example, the diameter and/or the length can also be determined in that a rectangle is inscribed around the falling object, wherein the diagonal of the rectangle describes the diameter.

The video data are provided to the evaluation unit 7. The evaluation unit 7 is part of the monitoring device 1 and is designed, for example, as a software module or as a computer unit. An evaluation unit 7 can in particular be connected to a camera 5a or 5b or to a plurality of cameras 5a and 5b. Based on the video data, the evaluation module determines whether the moving object is a person 6. The video data from a plurality of cameras are not evaluated linked with one another. In particular, the moving object is tracked by the evaluation unit 7, for example in successive images of the video data. The evaluation unit 7 is designed to determine a kinematic variable for the moving object based on the video data. The kinematic variable is, for example, a velocity profile and/or acceleration values of the moving object. Based on the kinematic variable, the evaluation unit is designed to determine a size and/or an extension or the diameter of the moving object. For example, the evaluation unit uses the falling acceleration for this purpose. After the falling acceleration or acceleration of gravity is known with respect to the numeric value, a size can be assigned via a comparison of the pixels passed per second or the pixels passed per square second of the moving object. The size of the moving object can be concluded by the determination of the pixels along the diagonal or the extension of the moving object. If the determined size of the moving object corresponds to a variable to be expected of a human or a person, it is assessed whether or not it is a man-overboard event.

In order that the determination of the kinematic variable and/or an extension of the moving object is possible, the monitoring device 1 and in particular the cameras 5a and 5b have to be calibrated. The definition and/or determination of the intrinsic and extrinsic calibration parameters and possibly of a ship model are used for the calibration.

In particular, parameters which are dependent on the installation, alignment, and/or distance of the camera 5a or 5b on the ship section 4 and/or on the ship 3 are understood as extrinsic calibration parameters. For example, an extrinsic calibration parameter is the viewing angle and/or inclination angle of the camera 5a, 5b with respect to a horizontal and/or the water surface. Parameters of the camera 5a, 5b which are dependent in particular on the imaging and/or imaging ratio of the camera 5a, 5b are understood as intrinsic calibration parameters. For example, intrinsic calibration parameters are a lens distortion and a focal length. The intrinsic calibration parameters can in particular be numerically adjusted and/or defined. They can be taken, for example, from a product datasheet of the camera 5a, 5b. The intrinsic calibration parameters are typically independent of the installation (exception: cameras having varifocal optical unit) and are thus constant. The extrinsic calibration parameters, in contrast, are dependent on the installation of the camera and therefore can be chronologically variable and in particular have to be defined and/or determined after the installation of the camera. For this purpose, the monitoring device 1 comprises the calibration unit 2.

The calibration unit 2 has an evaluation module 8 and an input module 9. The input module 9 has a data connection to the evaluation module 8. The evaluation module 8 is designed so that a user can input data graphically. For example, the input module 9 has a display, for example a display screen for this purpose, on which a model of the ship 3, the ship section 4, or the video data are displayed. The user can select calibration elements 10 by means of the input module 9. For example, the user draws points and/or a line in the video data for this purpose. A calibration element 10 is a geometric object which has a position, length, and orientation in the image, for example given by the starting and end points of a line, and furthermore has an orientation and/or length in the 3D world, for example perpendicular to the horizontal. Furthermore, the user can assign dimensions to the calibration element 10 by means of the input module 9, for example the length of a line in the 3D world.

The video data are provided to the evaluation module 8. Furthermore, the intrinsic calibration parameters 11 are provided to the evaluation module 8. These can have been sent and/or transmitted from the camera 5a, 5b, for example. Alternatively, the intrinsic calibration parameters 11 can be provided to the evaluation module 8 by input of the user at the input module 9. The evaluation module 8 is designed to determine the extrinsic calibration parameters 12 based on the intrinsic calibration parameters 11, the calibration element 10, and the video data.

The calibration element 10 is an item of structural information in the video data. For example, the calibration element 10 is formed as an alignment line, as the horizon line, or a defined line in the video data. The calibration elements 11 can also comprise known angles on the ship 3 and/or in the ship section 4. For example, known angles are that one object is perpendicular to another. In particular, the evaluation module 8 can comprise a ship model 13. The ship model 13 is designed, for example, as a 3D model. For example, the selection of the calibration element 10 can also take place in the displayed 3D model. The evaluation module 8 is designed, based on the items of information of the calibration element 10, such as position, length, and/or orientation and the comparison of how this calibration element appears in the video data, to determine the extrinsic calibration parameters 12, such as for example, the orientation and/or inclination of the view of the camera 5a, 5b on the ship section 4. The determined extrinsic calibration parameters 12 are provided as data in particular to the evaluation module 8.

Figure 2:
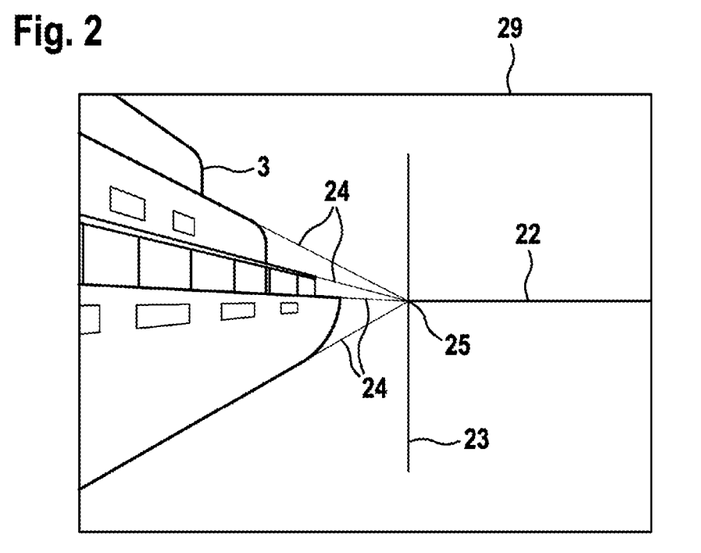
FIG. 2 shows a recording of the ship section having a calibration element.

FIG. 2 schematically shows an image and/or a depiction of the ship section 4 in the video data. The ship section 4 and/or its depiction show the ship 3 recorded from the perspective of the camera 5a. Furthermore, the horizon and/or the horizon line 13, which is bounded by the ocean and/or the ocean surface, is depicted. Due to the perspective recording of the camera 5a, the image has multiple alignment lines 24. The alignment lines 24 are represented, for example, by horizontal lines in the 3D world on the deck of the ship and/or its side 14, which extend toward the horizon and/or the horizon line 22. The alignment lines 24 intersect with the ship horizon 23 in the alignment point 58. The ship 3 floats on the water, so that the height of the ship is perpendicular to the ocean. For example, a line on the ship side 14 has been selected by the user in the model as the calibration element 10. This is perpendicular to the water surface, wherein the user can input and/or store this information by means of the input module 9, for example. The calibration element 10 in particular also has a length and/or an extent, wherein the length is 2 m here, for example. The user can also input and/or provide the information about the extent using the input module 9. The evaluation module 8 is designed to balance all items of information, i.e., previously known calibration parameters and calibration elements 10, with one another in such a way that the unknown calibration parameters are determined. The calibration parameters can be provided to the evaluation module 7.

Figure 3:
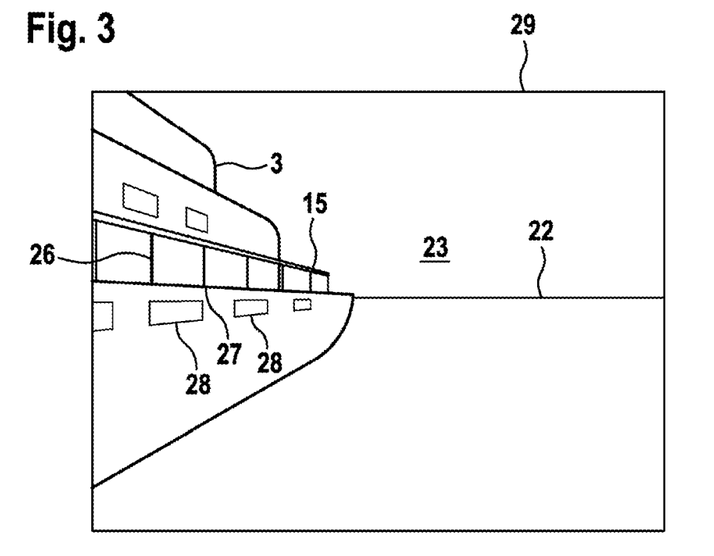
FIG. 3 shows a further recording having an alternative calibration element.

FIG. 3 shows a further example of a recording of the ship section 4 by the camera 5a. The ship 3 is again shown in the image, wherein it again tapers toward the horizon. The alignment line is defined, for example, by a railing 15 and/or set by the user. The course of the railing 15 as an alignment line can be taken to determine the orientation, location, and/or pivot of the camera during the recording of the ship section 4. This pivot and/or orientation is provided, for example, as an extrinsic calibration parameter to the evaluation module after the analysis. For example, a pillar 26 of known height, which is arranged on the deck 27, can be selected as the calibration element 10.

Figure 4:
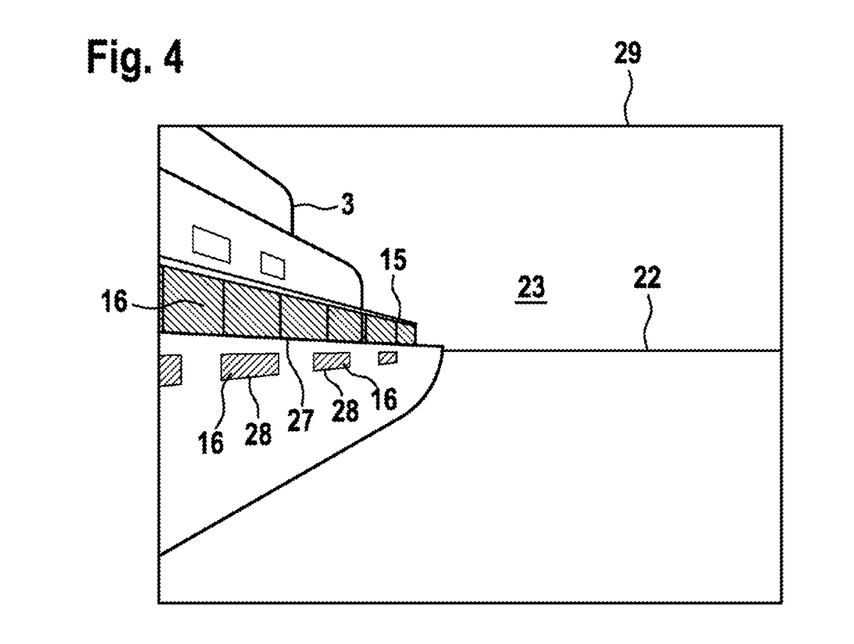
FIG. 4 shows an image of the ship section with defined hazardous regions.

FIG. 4 shows the ship section 4 in the form of an image in the video data, recorded using the camera 5a. This image is displayed and/or depicted on the input module 9, for example. The user can define regions in this image for which monitoring and/or evaluation of moving objects is provided if the starting point of the movement of the moving object is in this region. The regions thus selected form hazardous regions 16. The hazardous regions 16 can be selected and/or input, for example, in area form. For example, for this purpose the user defines the corner points and/or edge points, wherein subsequently a closed contour is formed, which is saved as the hazardous region 16. A section along the railing 15 and the window openings 28 form the hazardous regions 16 here. For example, a moving object which does not have a starting point in the hazardous region 16 is not interpreted as a man-overboard event by the evaluation module 8. It is thus possible for the evaluation module 8 to enable a reliable evaluation while saving data and resources. Furthermore, false alarms are also thus reduced in that uninteresting and/or excluded regions are excluded from the evaluation.

The invention claimed is:

1. An electronic calibration unit (2) for a monitoring device (1),
   wherein the monitoring device (1) is designed as a man-overboard monitor,
   wherein the monitoring device (1) includes at least one camera (5a, 5b) for video monitoring of a ship section (4) and for providing video data,
   wherein the camera (5a, 5b) has at least one intrinsic calibration parameter (11) and at least one extrinsic calibration parameter (12),
   wherein the video data are provided to the electronic calibration unit (2), and the electronic calibration unit (2) is configured to:
      receive an input of at least one calibration element (10) by a user,
      determine unknown calibration parameters (11, 12) based on the calibration element (10), and
      display, via a display module, the video data,
   wherein one or more calibration elements are definable, selectable, adjustable, and/or positionable, and
   wherein the electronic calibration unit is configured to display and/or draw calibration elements based on the intrinsic calibration parameters (11) and the extrinsic calibration parameters (12) on the display module, in accordance with the position thereof on a 3D model, in the video data.

2. The electronic calibration unit (2) as claimed in claim 1, wherein the extrinsic calibration parameters (11) include at least one selected from the group consisting of an alignment of the camera (5a, 5b) in a three-dimensional world coordinate system, an inclination angle to a water surface, an inclination angle to a vertical ship plane (4), a distance to a water surface, and a distance to a vertical ship plane.

3. The electronic calibration unit (2) as claimed in claim 1, wherein the intrinsic calibration parameters (11) comprise a focal length and/or lens distortion of the camera (5a, 5b).

4. The electronic calibration unit (2) as claimed in claim 1, wherein the electronic calibration nit (2) is configured to define, input, and/or select some or all intrinsic (11) and/or some or all extrinsic (12) calibration parameters by way of a user.

5. The electronic calibration unit (2) as claimed in claim 1, wherein the calibration elements (10) are formed by one or more alignment lines or by sections of known length and known orientation in 3D.

6. The electronic calibration unit (2) as claimed in claim 1, the electronic calibration unit (2) being further configured to determine the unknown calibration parameters (12) based on a 3D model (13) of the ship (3) and/or the ship section (4).

7. The electronic calibration unit (2) as claimed in claim 1, the electronic calibration unit (2) being further configured to recognize a change of the calibration parameters (12) based on a chronological variation of local structures in the video data.

8. The electronic calibration unit (2) as claimed in claim 7, wherein the change of the calibration parameters (12) is a pivot of a camera and/or a change of the 3D surface of the scene as a decalibration.

9. The electronic calibration unit (2) as claimed in claim 1, wherein the electronic calibration unit (2) includes a module for graphic input, definition, and/or selection of the calibration element (10).

10. The electronic calibration unit (2) as claimed in claim 1, wherein the input module (9) is configured to enable a type definition, orientation, and/or dimensioning of a calibration element (10) by the user.

11. A monitoring device (1) for man-overboard monitoring having an electronic calibration unit (2), the monitoring device (1) is designed as a man-overboard monitor and comprising:
   at least one camera (5a, 5b) for video monitoring of a ship section (4) and for providing video data, the camera (5a, 5b) having at least one intrinsic calibration parameter (11) and at least one extrinsic calibration parameter (12),
   wherein the video data are provided to the calibration unit (2), and the electronic calibration unit (2) is configured to:

receive an input of at least one calibration element (10) by a user, determine unknown calibration parameters (11, 12) based on the calibration element (10), determine a kinematic variable of an object moving in a monitoring region (4) based on the video data, wherein the electronic calibration unit (2) is configured to study the object for the presence of a man-overboard event based on the kinetic variable, and display, via a display module, the video data, wherein the electronic calibration unit (2) is configured to define a hazardous region as part of the ship section, wherein the electronic calibration unit (2) is configured to discard starting positions outside the hazardous region as the man-overboard event.

12. The monitoring device (1) as claimed in claim 11, wherein the electronic calibration unit (2) is configured to determine a starting position of the moving object based on the intrinsic calibration parameters (11) and/or the extrinsic calibration parameters (12) and/or the kinetic variable, wherein the electronic calibration unit (2) is configured to study the object for a presence of a man-overboard event based on the starting position.

13. The monitoring device (1) as claimed in claim 11, wherein the electronic calibration unit (2) is configured to determine a starting position of the fall of a person from on board in a higher order ship coordinate system.

14. An electronic calibration unit (2) for a monitoring device (1), wherein the monitoring device (1) is designed as a man-overboard monitor, wherein the monitoring device (1) includes at least one camera (5*a*, 5*b*) for video monitoring of a ship section (4) and for providing video data, wherein the camera (5*a*, 5*b*) has at least one intrinsic calibration parameter (11) and at least one extrinsic calibration parameter (12), wherein the video data are provided to the electronic calibration unit (2), and the electronic calibration unit (2) is configured to:

receive an input of at least one calibration element (10) by a user, determine unknown calibration parameters (11, 12) based on the calibration element (10), and display, via a display module, the video data, wherein the electronic calibration unit (2) is further configured to recognize a change of the calibration parameters (12) as a decalibration based on a chronological variation of local structures in the video data and perform a redetermination of the calibration parameters (11, 12) in response to recognizing the decalibration.

\* \* \* \* \*